(12) United States Patent
Gleeson

(10) Patent No.: US 6,477,160 B2
(45) Date of Patent: Nov. 5, 2002

(54) COMMUNICATION DEVICE HAVING PROXIMITY CONTROLLED TRANSMISSION

(75) Inventor: John K. Gleeson, Boca Raton, FL (US)

(73) Assignee: Motorola, Inc., Schaumrurg, IL (US)

( * ) Notice: Subject to any disclaimer, the term of this patent is extended or adjusted under 35 U.S.C. 154(b) by 27 days.

(21) Appl. No.: 09/813,015

(22) Filed: Mar. 21, 2001

(65) Prior Publication Data

US 2002/0136174 A1 Sep. 26, 2002

(51) Int. Cl.$^7$ .................................................. H04J 3/00
(52) U.S. Cl. ...................................... 370/337; 370/468
(58) Field of Search ............................. 370/337, 347, 370/468, 329

(56) References Cited

U.S. PATENT DOCUMENTS 5,416,797 A * 5/1995 Gilhousen et al. .......... 375/705
5,546,383 A * 8/1996 Cooley et al. .............. 370/330
6,339,590 B2 * 1/2002 Kim .......................... 370/331

* cited by examiner

Primary Examiner—Chau Nguyen
Assistant Examiner—Alexander O. Boakye
(74) Attorney, Agent, or Firm—Daniel C. Crilly

(57) ABSTRACT

A communication device (12) transmits a communication signal during repetitive time slots. The communication device (12) includes a duty-cycle adjustment signal generator (82) that generates an adjustment signal based on a proximity signal. A controller (54) in response to the proximity signal, adjusts a transmission duty cycle relating to the repetitive time slots for transmitting a communication signal during a time slot. The communication signal is then radiated via an antenna (70).

18 Claims, 6 Drawing Sheets

COMMUNICATION DEVICE HAVING PROXIMITY CONTROLLED TRANSMISSION

FIELD OF THE INVENTION

In general, the present invention relates to the field of communication systems, more particularly, to a communication device that transmits a communication signal during repetitive time slots.

BACKGROUND OF THE INVENTION

Communication systems that communicate voice and data messages are extensively used in telephony and wireless communication systems. For example, ETSI (European Telecommunication Standard Institute) has specified a GSM (Global Standard for Mobile Communication) protocol that uses TDMA (time division multiple access) to communicate control, voice and data information over RF (radio frequency) channels. In the U.S., the TIA (Telecommunication Industry Association) has published a number of Interim Standards, such as IS-136, that define various versions of D-AMPS (Digital Advanced Mobile Phone Service) with the capability of transmitting voice and data to subscribers. GPRS (General Packet Radio Service) is a non-voice value added service that allows information to be sent and received across GSM as well as the IS-136 systems. GPRS supplements today's Circuit Switched Data and SMS (Short Message Service) of the GSM at theoretical maximum speeds of up to 171.2 kilobits per second (kbps) using eight timeslots at the same time. Because of the spectrum efficiency of GPRS, there is less need to build in idle capacity that is only used in peak hours. GPRS therefore lets network operators maximize the use of their network resources in a dynamic and flexible way, along with user access to resources and revenues.

GPRS involves overlaying a packet based air interface on the existing circuit switched GSM network, thereby giving end users an option to use a packet-based data service. With GPRS, the information is split into separate but related "packets" for transmission and re-assembly at a receiving end. Because of packet switching configuration of GPRS, radio resources are used only when end users are actually sending or receiving data. Rather than dedicating a radio channel to an end user communication device for a fixed period of time, the available radio resource can be concurrently shared between several communication devices, thereby allowing a large number of GPRS users to share the same bandwidth within a single cell. The actual number of users supported depends on the application being used and how much data is being transferred.

High immediacy is a very important feature for time critical applications. Subject to radio coverage, GPRS also facilitates instant connections whereby information can be sent or received immediately as the need arises. GPRS also facilitates new applications not previously available over GSM networks due to the limitations in speed of Circuit Switched Data (9.6 kbps) and length of the SMS (Short Message Service) which is 160 characters. For example, GPRS enables Mobile Internet functionality by allowing inter-working between the existing Internet and a GPRS-enabled network. As such, any service that is used over the fixed Internet today, for example, FTP (File Transfer Protocol), web browsing, chat, email, telnet, can also be available over the GPRS-enabled network.

It is known that communication signals that are communicated over wireless channels are influenced when in proximity of an object or human body. When a communication device transmits electromagnetic radiation in proximity of the object, the electromagnetic radiation can be perturbed and suppressed in the direction of the object. The influence of the object on the electromagnetic radiation can effect communication performance of the communication device. For example, packet data transmissions in systems that provide GPRS can be degraded when a GPRS enabled communication device is in the proximity of an object.

Accordingly, there exists a need to improve communication performance when a communication device is in proximity of an object.

DETAILED DESCRIPTION OF THE INVENTION

Figure 1:
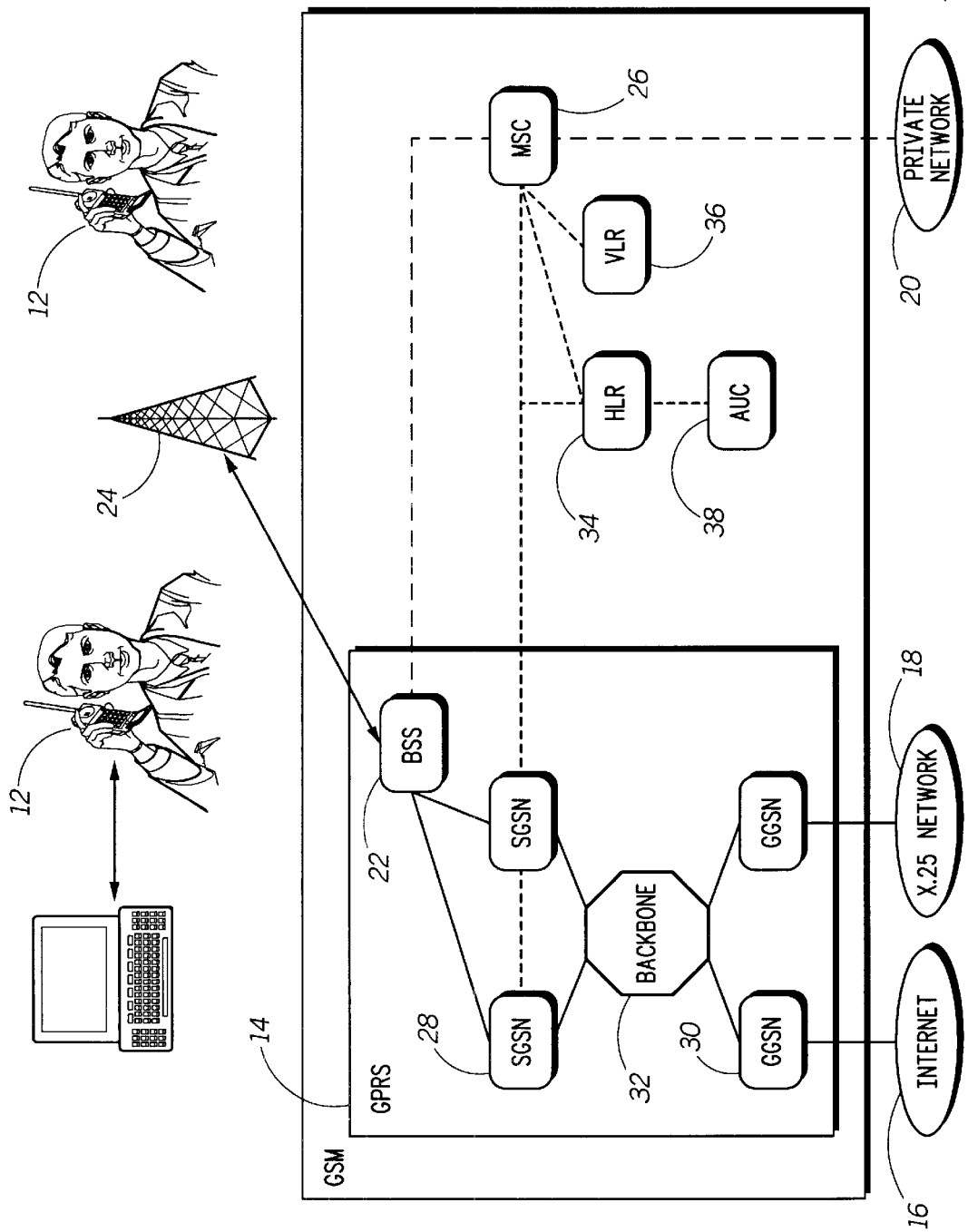
FIG. 1 illustrates a block diagram of a communication system within which the present invention is advantageously used.

The present invention relates to a communication device that transmits a communication signal during repetitive time slots. For example, in a TDMA system, such as GSM that supports GPRS, repetitive time frames are divided into 8 time slots. The communication device, which is also GPRS-enabled, can transmit data within any one of the time slots. The communication device includes a duty-cycle adjustment signal generator that generates an adjustment signal. The adjustment signal is used to adjust a transmission duty cycle relating to the repetitive time slots within a time frame, for transmitting a communication signal during one or more time slots. The duty cycle is a percent of time in which the communication signal is transmitted within the time frame. In the GSM/GPRS system, for example, data transmission during all of the eight time slots corresponds to a 100 percent transmission duty cycle that provides the highest data rate. For a 50 percent transmission duty cycle, the communication device would transmit on four time slots of the time frame at a lower data rate, i.e., half the data rate of the 100 percent transmission duty cycle data rate. Under the present invention, the transmission duty cycle can be adjusted either by increasing or decreasing it for transmitting at higher or lower data rates, respectively. The communication device also includes an antenna that radiates the communication signal during the time slots that correspond to the adjusted duty cycle.

In one exemplary embodiment, the duty-cycle adjustment signal generator, is responsive to a proximity sensor for generating the adjustment signal relative based on the proximity of the communication device to an object or, for example, a human body. The proximity sensor, which generates a proximity signal, can be, for example, a switch that determines whether or not the object is inside or outside the operating proximity of the communication device. In other words, the proximity signal indicates whether or not the communication device is close to the object or not. As used herein, the proximity signal corresponds to any signal that relates to a position and/or location of the communication device. For example, the position can correspond to whether a communication device is worn or is around a human body or not.

According to another exemplary embodiment, the user of the communication device can adjust the transmission duty cycle manually, via an adjustment means that allows manual user interface. For example, the user can be presented with an option for selecting a desired transmission duty on a display screen. Alternatively, the adjustment means can be a control used to generate the adjustment signal, via the duty-cycle adjustment signal generator, to adjust the transmission duty-cycle manually.

In accordance with one of the more detailed features of the present invention, the power of the radiated communication signal can also be based on the proximity signal. For example, the power of the electromagnetic radiation can be either increased or decreased based on the proximity of the communication device to an object.

In accordance with other more detailed features of the present invention, the communication device also includes a transmitter that is based on the adjustment signal transmits a communication resource allocation request for allocation of resources that correspond to a specified transmission data rate. For example, under the GPRS configuration, the resource allocation request can be transmitted before initiating each packet data transmission. A controller in the communication device can be responsive to the adjustment signal to transmit the request for allocation of a number of time slots, before each packet of data is transmitted on a per packet basis.

Referring to FIG. 1, a block diagram of a communication system 10 that advantageously incorporates the present invention is shown. The communication system 10 is, by way of example, a GSM communication system, which provides wireless voice and data communication capability for a plurality of communication devices 12. The mode of operation of a GSM communication system 10 is described in ETSI documents ETS 300 573, ETS 300 574 and ETS 300 578. Therefore, the operation of the communication system 10 is described only to the extent necessary to enable one skilled in the art to make and use the present invention. Although the present invention is described as embodied in a GSM system, those skilled in the art would appreciate that a wide variety of other communication systems, such as those based on PDC (Personal Digital Cellular), D-AMPS, UMTS (Universal Mobile Telecommunication Standard), or CDMA (Code Division Multiple Access) standards, can also be utilized. Similarly, the mobile packet data service of the invention can be based on other standards, such as CDPD (Cellular Digital packet Data), or UMTS packet data.

The communication system 10 is designed as a hierarchical network with multiple levels for managing calls and transmission of voice and packet data. Using an allocated set of uplink and downlink RF channels, a number of communication devices 12 operating within the communication system 10 participate in calls using allocated time slots that form logical communication channels. At a higher hierarchical level, a group of MSCs (Mobile Service Switching Center s), of which only one MSC 26 is shown, are responsible for the routing of calls from an originator to a destination. In particular, they are responsible for setup, control and termination of calls and broadcasting of text messages.

At a lower hierarchical level, each MSC 26 is connected to a group of base station subsystems, of which only one base station, BSS 22, is shown. The primary function of a BSS 22 is radio resource management. For example, based on reported received signal strength at the communication devices 12, the BSS 22 determines whether to initiate a hand over. Under the GSM standard, the BSS 22 communicates with the MSC 26 using a standard interface known as the A-interface. At a still lower hierarchical level each one of the BSS 22 control a group of base transceiver stations, of which only one transceiver station, BTS 24, is shown. Each BTS 24 includes a number of transceivers (TRX's) that use the uplink and downlink RF channels to serve a particular common geographical area. Therefore, The BTS 24 primarily provides the RF links for the transmission and reception of data bursts to and from the communication device 12 within their designated cell.

In an exemplary embodiment, the mobile data massaging service of the communication system 10 is provided by a GPRS defined standard. A GPRS network 14 deployed in the communication system 10 utilizes the existing GSM nodes, in addition to others, for supporting packet switching, and inter-working with existing packet data networks, such as the Internet 16, an X-25 network 18 and a private network 20. The communication devices 12 are also equipped to handle GPRS provided mobile packet data service, in addition to handling voice service. Examples of such a communication device 12 includes smart phones, Personal Digital Assistants (PDA), and portable computers, such as a lap tops, or palm tops that operate with or without a cellular telephone.

While voice traffic is noted to the MSC 26, GPRS packets are sent from the BSS 22 to a Serving GPRS Support Node (SGSN) 28. The SGSN 28 is the node within the GSM infrastructure that sends and receives packet data to and from the communication devices, while keeping track of the communication devices within a covered service area. The SGSN 28 communicates with a GGSN (Gateway GPRS Support Node) 30, via a backbone network 32, which is a system that maintains connections with other networks such as the Internet 16, X.25 networks 18 or private networks 20. The GPRS network 14 can use multiple serving nodes, but requires only one gateway node for connecting to an external network such as the Internet 16.

The communication device 12 sends packets of data via the SGSN 28 to the GGSN 30, which converts them for transmission over a desired network. As mentioned above, the desired network could be the Internet 16, X.25 networks 18 or private networks 20. For example, IP (Internet Protocol) packets from the Internet 16 addressed to the communication device 12 are received by the GGSN 30, forwarded to the SGSN 28 and then transmitted to the communication device 12. To forward IP packets or X.25 packets between each other, the SGSN 28 and GGSN 30 encapsulate these packets using a specialized protocol called the GPRS tunnel protocol (GTP), which operates over the top of standard TCP/IP protocols.

The MSC 26 and SGSN 28 are associated with corresponding HLR 34 (Home Location Registers) and VLR 36 (Visitors Location Registers), which maintain user/ subscriber information for roaming and billing purposes. An AUC 38 (Authentication Center) provides authentication functionality when placing voice and data calls. As illustrated by the dotted lines, the VLR 36 and HLR 34 and AUC 38 need not be physically associated with the location of a MSC 26 or SGSN 28, since the network gives full connectivity to all of the associated components and nodes. Generally, the MSC 26 is also connected to a PSTN (public switching telephone network), to give connectivity between fixed landline subscribers and mobile subscribers.

Figure 2:
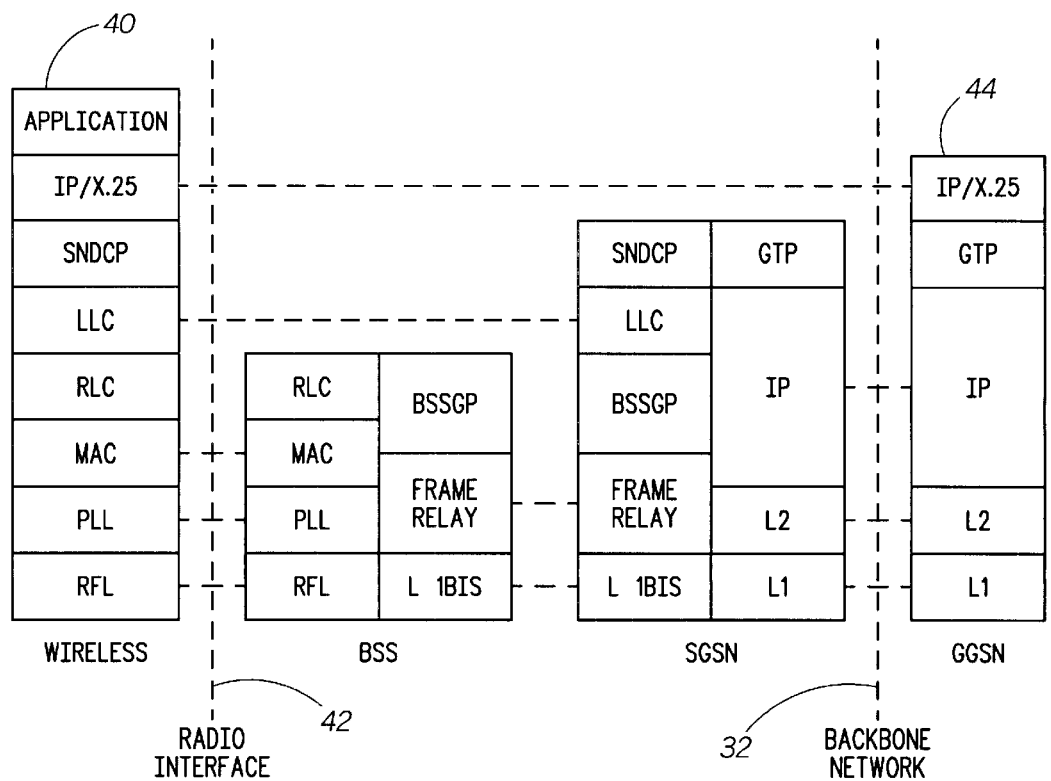
FIG. 2 illustrates a GPRS protocol stack used in the communication system of FIG. 1.

Referring to FIG. 2, a communication protocol stack 40 for communicating data packets between the communication system 10 and the communication devices 12 is shown. Among other things, the protocol stack 40 comprises: an SNDCP (sub-network dependent control protocol) layer that encrypts and compresses data packet segments; an LLC (logical link control) layer that links an underlying air or radio interface to the SGSN 28; an RLC (radio link control) layer that supports error correction; a MAC (medium -access control) layer that supports slotted ALOHA scheme; a PLL (physical link sub-layer) that frames and codes the packets and also manages the physical medium error; and an RF (radio frequency) layer (RFL) that modulates and demodulates the transmitted packet over the radio frequency channels. The details of the SGSN 28 and GGSN 30 are both invisible and irrelevant to the user who simply experiences a straightforward IP or X.25 connection that just happens to be wireless. As stated above, the radio frequency channels in the GSM/GPRS implementation are divided into repetitive frames comprising 8 time slots. At the radio interface 42 the IP/X.25 packet is converted to a necessary protocol stack 44 used in a wired network.

Figure 3:
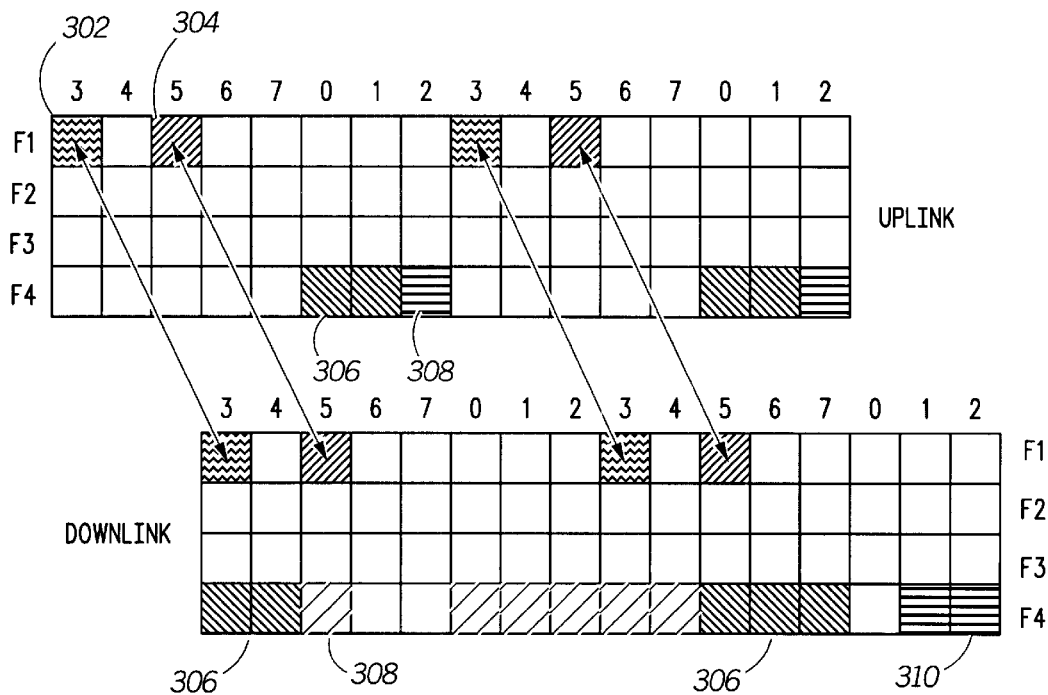
FIG. 3 illustrates a diagram for a GPRS air interface in the communication system of FIG. 1.

Referring to FIG. 3, a diagram illustrates the air interface for the communication system 10. As show, the communication channels comprise RF channels F1, F2, F3, and F4 having specified carrier frequencies. In the communication system 10, the RF channel (uplink or downlink) is divided into repetitive time frames during which voice and date are communicated. Each repetitive time frame, which can be a super-frame or a hyper-frame, is further divided into time slots (0–7) or logical channels that carry packets of information, such as voice communication packets 302, 304, or GPRS packets 306, 308, 310. Speech is transmitted during logical channels designated as traffic channels (TCH). All signaling functions pertaining to call management in the system, including initiation, hand over, and termination are handled via information transmitted over signaling channels, which can be dedicated or associated signaling channels.

Figure 4:
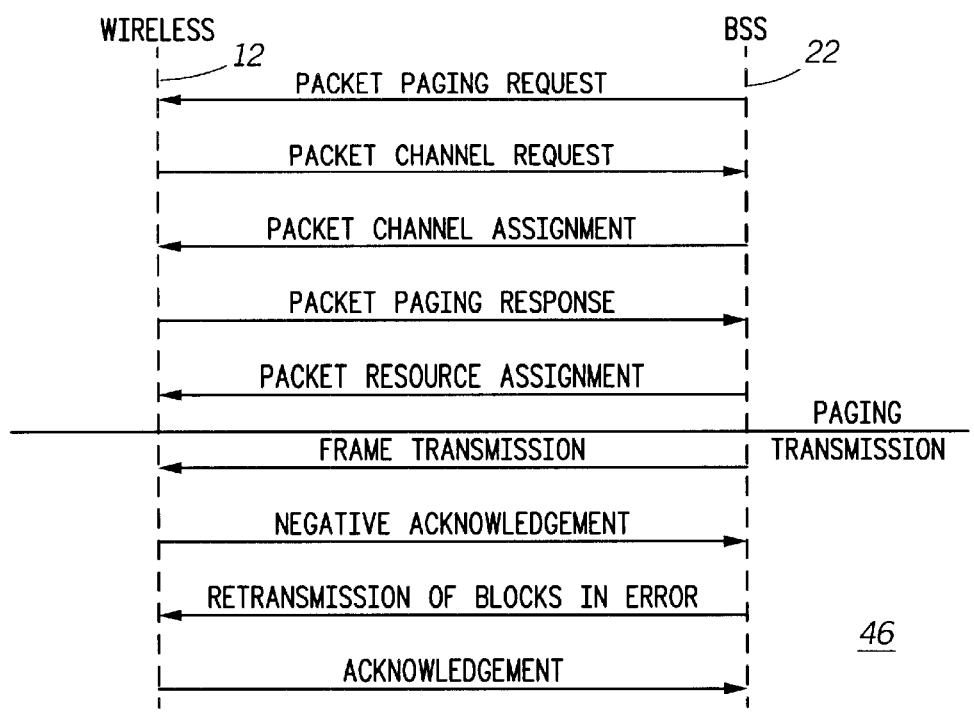
FIG. 4 illustrates a sequential diagram for a base station initiated data transfer in the communication system of FIG. 1.

Referring to FIG. 4, a sequential diagram illustrates a base station initiated data transfer 46 in accordance with the present invention. In the data transfer process 46, the BSS 22 sends a packet paging request to the communication device 12 to initiate the data transfer process 46. In response to a packet channel request from the communication device 12 to the BSS 22 requesting a transmission channel, the BSS 22 assigns and transmits a packet channel assignment to the communication device 12. In response to the communication device 12 sending a packet paging response and receiving a packet resource assignment, the BSS 22 transmits the packet and continues with various acknowledgements and error checks which completes the transmission.

Figure 5:
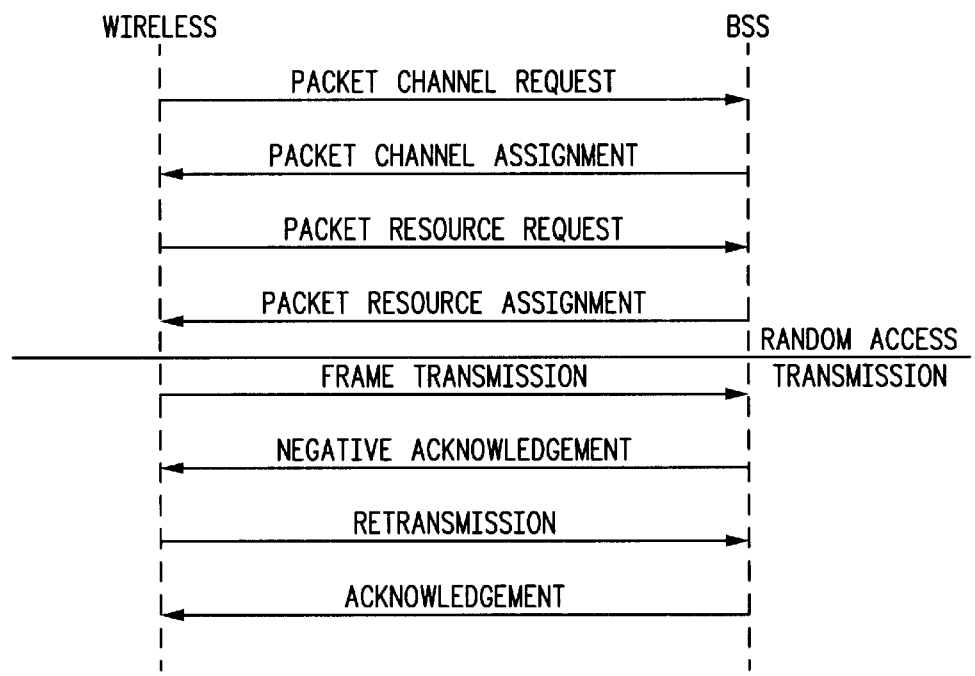
FIG. 5 illustrates a sequential diagram for a communication device initiated data transfer in the communication system of FIG. 1.

Referring to FIG. 5, a sequential diagram illustrates a communication device initiated data transfer 48 in accordance with the present invention. In the communication device initiated data transfer 48 process, the communication device 12 sends a packet channel request to the BSS 22, requesting a transmission frequency channel and time slots. Once the communication device 12 receives the packet frequency channel assignment, the communication device 12 sends a packet resource request, referred to as a communication resource allocation request, to the BSS 22. The BSS 22 then assigns resources to the communication device 12 which can, for example, correspond to a requested or assigned transmission duty cycle relative, for example, to a number assigned time slots. The communication device 12 then transmits the packet and continues with the various acknowledgements and error checks which completes the transmission.

Figure 6:
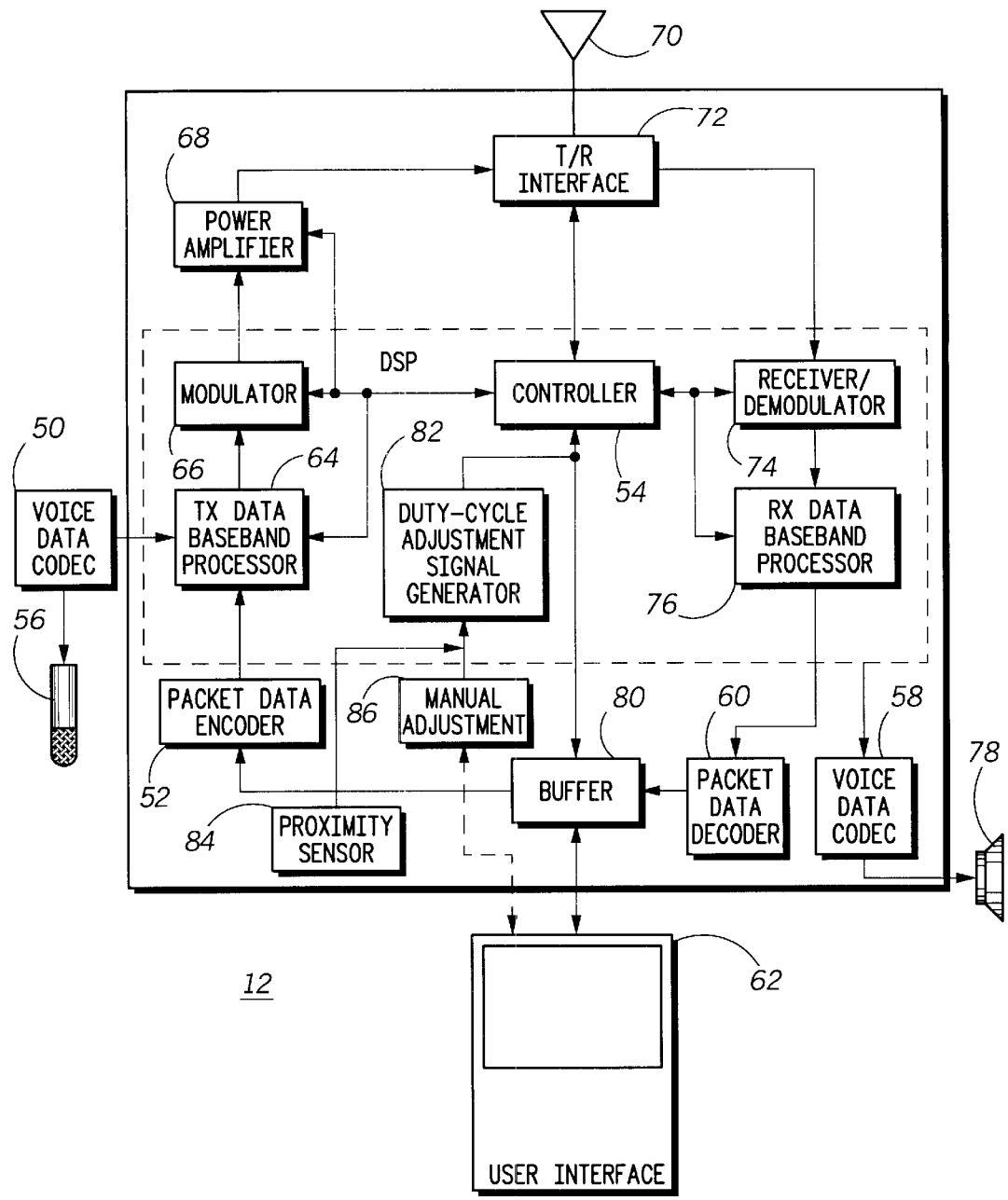
FIG. 6 illustrates an electrical block diagram of a communication device in accordance with the present invention.

Referring to FIG. 6, a block diagram of a communication device 12 that incorporates the present invention is shown. Along with a voice service, the communication device 12 supports a data service. In the preferred embodiment of the present invention, the communication device 12 is a portable two-way device that operates in transmit and receive modes for communicating voice data and packet data over one or more RF channels. In one exemplary embodiment, the communication device 12 can be operating within the communication system 10 of FIG. 1, which provides a voice and data service within a coverage area using the GSM/GPRS protocols. As stated above, the communication device 12 can be employed in a wide range of communication systems 10, including systems that are based on the GSM and IS-136 standards. With any one of these systems, a user can use the communication device 12 of the present invention to establish voice and data service with another user.

The communication device 12 operates under the control of a controller 54 that provides duplex data communication under a specified communication protocol. In the exemplary embodiment of the present invention, the controller 54 is programmed to provide the duplex communication service using radio frequency channels that are divided into repetitive time frames. Under the GSM protocol, for example, each time frame is divided into 8 time slots.

In the transmit mode, the communication device 12 includes a microphone 56 that produces a voice signal that corresponds to the user's voice. The voice signal is converted to voice data using a voice data code 50 in a manner well known in the art. The communication device 12 under the control of the controller 54 also produces packet data using a packet data encoder 52, for example, based on user input as received from a user interface 62. A transmit-data baseband processor 64 processes the voice data and packet data generated at the communication device 12. Based on a specified modulation technique, a modulator 66 modulates the baseband-processed voice data and packet data to produce a modulated signal. A power amplifier 68 amplifies the modulated signal to generate an amplified modulated communication signal at a specified frequency or frequency spectrum. The amplified modulated communication signal is radiated via an antenna 70 through an TX/RX interface 72 that facilitates the duplex data communication under the control of the controller 54. The antenna 70 can be any one of an antenna known to those skilled in the art, for example, a monopole antenna, a dipole antenna, an array of dipole antennas, a micro strip antenna, and a plasma antenna.

In the receive mode, the communication device 12 intercepts electromagnetic radiation at the antenna 70. The intercepted electromagnetic is processed by a receiver and demodulated using a receiver/demodulator 74 in a manner well known to one of ordinary skill in the art. The communication signal resulting is coupled to a receive-data baseband processor 76 through to the TR/RX interface 72. The communication signal is segregated into the packet data for processing in a packet data decoder 60 and the voice data code 58 using the receive-data baseband processor 76. The voice data is routed to a speaker 78 in order to convert the communication signal into audible sound. The packet data is routed to a buffer 80, which manages the packet data. The packet data can then be loaded onto the user interface 62 for user interaction. It would be appreciated that the data processing and control functions can be incorporated into a well-known DSP that is programmed to for example perform baseband processing and other functions.

In accordance with the present invention, the communication device 12 includes a duty-cycle adjustment signal generator 82 that generates a duty-cycle adjustment signal. The duty cycle adjustment signal can be generated based on a proximity signal generated by a proximity sensor 84 that upon activation sends the proximity signal to the controller 54. The proximity sensor 84 can be, for example, an infrared sensor, an antenna position sensor, a communication device holster switch, a charger switch, a gravity switch, and any other such switch known to one of ordinary skill in the art to detect the presence of the communication device 12 with a body. For example, when the proximity sensor 84 is positioned in a communication device holster, in which case the sensing signal would correspond to the communication device 12 occupying the holster, the controller 54 would acknowledge that the communication device 12 is in the communication device holster and typically within a known distance to the body. In addition, the antenna 70 associated with the communication device 12 would also be within the known distance to the body. The duty-cycle adjustment signal generator 82 can also be responsive to a manual adjustment interface 86 which can be a user activated mechanism such as a push button switch, a knob or a keyboard switch for generating the duty-cycle adjustment signal.

Figure 7:
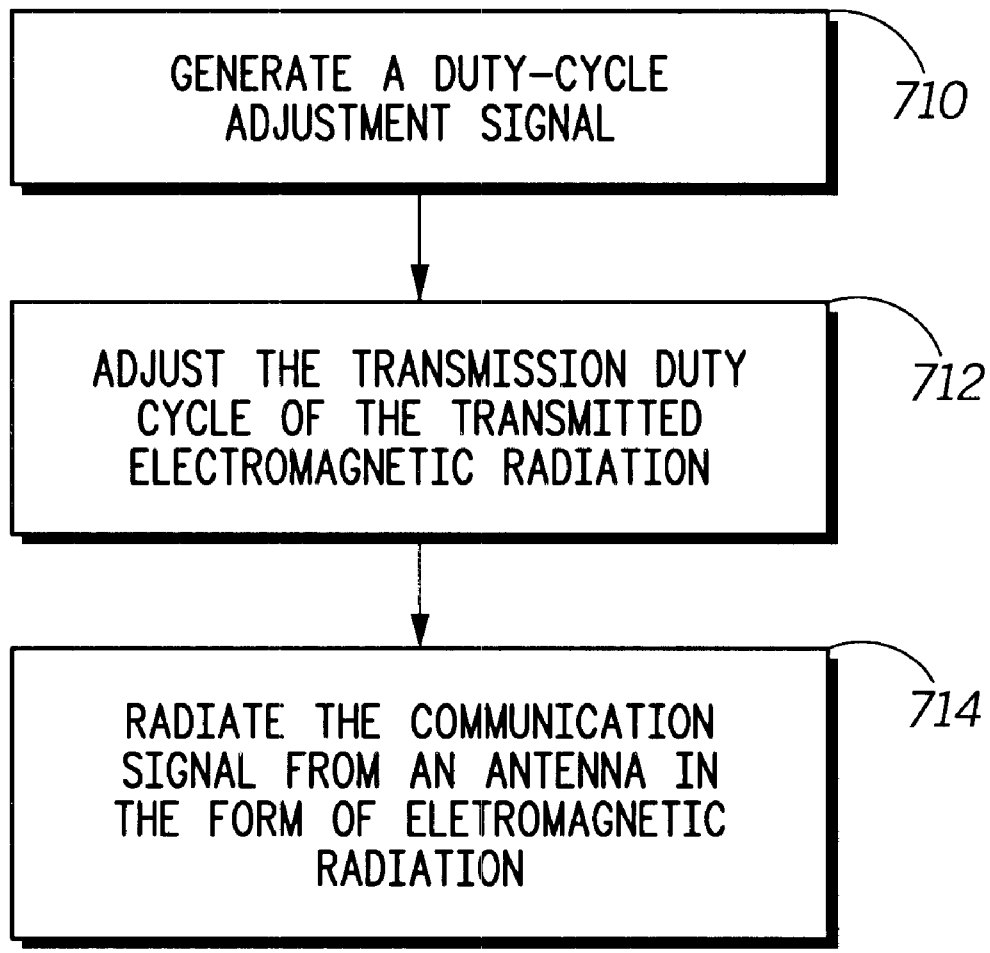
FIG. 7 illustrates a flow diagram for a method in accordance with the present invention.

Referring to FIG. 7, a flow diagram illustrates a method of the present invention. As stated above, the communication device 12 generates a duty-cycle adjustment signal based on the proximity signal generated by the proximity sensor 84, block 710. For example, when the communications device is worn on the body, the proximity sensor generates a signal indicating that the communication device is within the proximity of the body. The proximity signal can for example be generated by a switch, based on a switch disposed on the communication device 12 that indicates that the user is using the communication device or not, i.e., that the communication device 12 is in close proximity to the user, such as when the communication device is in a holster or other similar mechanism. In response to the proximity signal, which generates the duty cycle adjustment signal, determinations are made local to or remote from the communication device 12 to adjust the transmission duty cycle of the transmitted signal in order to improve performance of the communication device 12, at block 712.

For example, when the communication device is worn around a body, the duty cycle can be decreased. On the other hand, when the communication device is not within the proximity of the body the transmission duty cycle can be increased. When the transmission duty cycle is increased, the number of transmission time slots available for transmission is increased in which case the communication device 12 would be transmitting over a longer period of time within the time frame. Similar to the transmission duty cycle, the controller 54 can adjust the transmission power based on the proximity signal. Once the controller 54 finalizes the adjustments of the duty cycle and power of the communication signal, the communication device 12 radi-ates the communication signal from the antenna 70 in the form of electromagnetic radiation, block 714.

Figure 8:
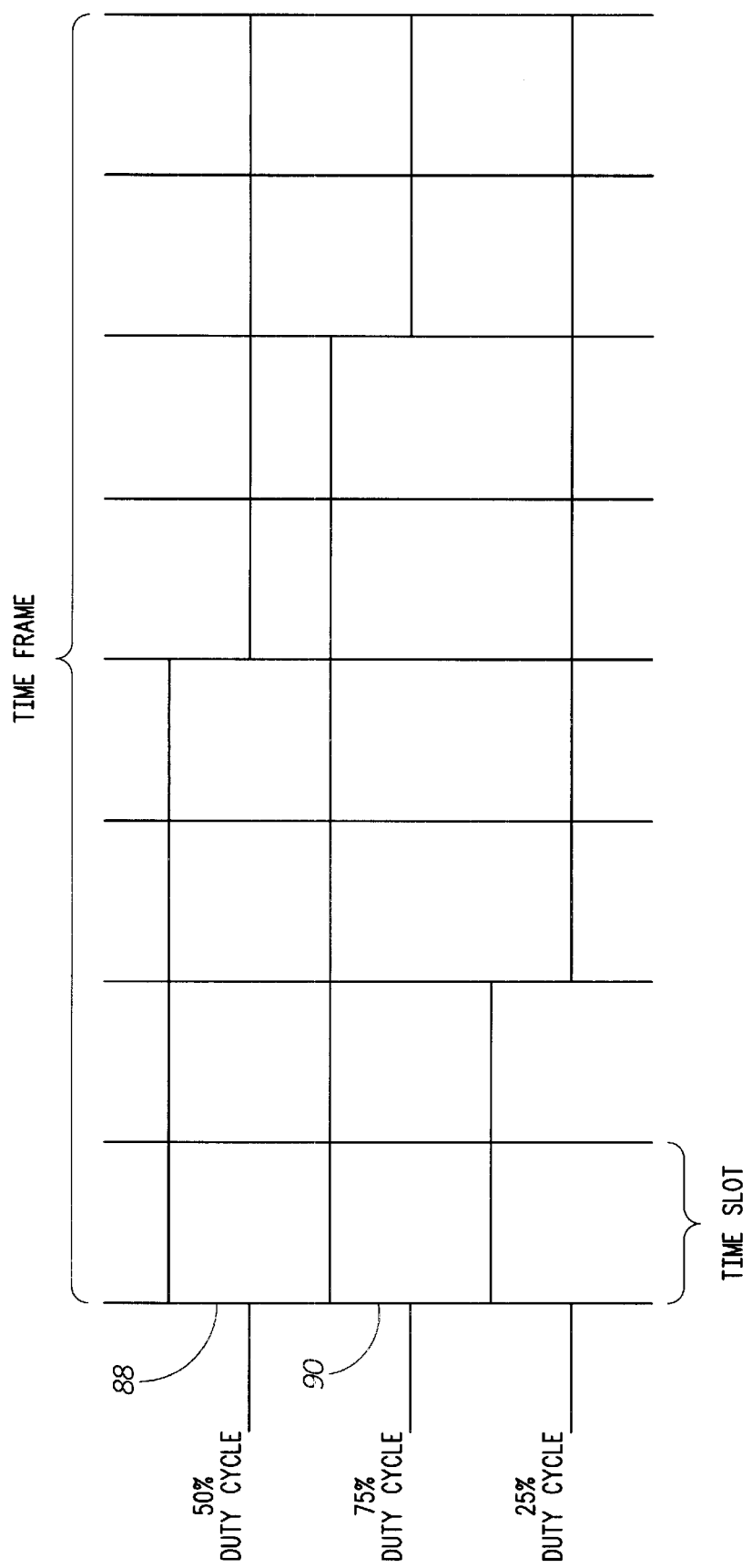
FIG. 8 illustrates three exemplary timing diagrams of a communication channel that is divided into repetitive time slots.

For example, referring to FIG. 8, in the communication system 10, the communication device 12 can transmit on one or more of the eight time slots within a time frame for voice or data communication. In case the communication device 12 transmits on four of the eight time slots, the corresponding transmission duty cycle would be 50 percent duty cycle 88. Based on the proximity signal, the transmission duty cycle could be increased to, for example, 75 percent duty cycle 90, in which case the communication device 12 would be transmitting on six of the eight time slots within the time frame.

Once, the controller receives the duty-cycle adjustment signal, the communication device 12 sends a communication resource allocation request to the BSS 22. Under one arrangement, a desired duty cycle can be determined at the communication device 12. For example, the duty cycle can be manually adjusted as to allow a user to set the data transmission rate. The communication device keyboard or a switch or other similar mechanism can be used to manually enter a desired transmission duty cycle, which can also be displayed on the display. Under this arrangement, the communication device 12 can, for example, transmit a communication resource allocation request for a 75 percent transmission duty cycle. The BSS 22 then determines when six of the eight time slots are available for transmission. When the requested duty cycle cannot be accommodated, then the BSS 22 provides the maximum duty cycle available, otherwise the BSS 22 accommodates the request.

Under another arrangement, the BSS 22 can assign a transmission duty cycle to the communication device 12 based on data corresponding to the proximity signal, which is transmitted from the communication device 12 to the BSS 22. The resource allocation assignment can be based on the available resources as determined by the BSS 22. In a similar manner, the communication device 12 can send a communication resource allocation request for a specified transmission power.

At the initiation of each packet data transmission, the communication device 12 sends the request to the BSS 22 for every transmitted packet. The BSS 22 then transmits a response relating to the communication resource allocation request to the communication device 12 and ultimately to the controller 54 in the communication device 12. The controller 54 then adjusts the transmission duty cycle in order to improve performance of the communication device 12. When the transmission duty cycle is increased, the number of transmission time slots is increased, in which case the communication device 12 would be transmitting over a longer period of time within the time frame.

From the foregoing description it would be appreciated that the present invention provides a method for maximizing the performance of a communication device by adjusting both the duty cycle of the communication signal and when necessary the power of the transmitted signal, based on proximity sensors and communication system resources. The performance of the communication device 12 is maximized by reducing the duty cycle when the communication device 12 is on the body, in which case the body interaction would degrade the transmission of the communication signal, and increases the duty cycle when the communication device 12 is off the body, thus improving the transmission of the communication signal.

The invention has been described in detail with respect to preferred embodiments, and it will now be apparent from the foregoing to those skilled in the art that changes and modifications can be made without departing from the invention in its broader aspects, and the invention, therefore, as defined in the claims is intended to cover all such changes and modifications as fall within the true spirit of the invention.

What is claimed is:

1. A communication device that transmits a communication signal during repetitive time slots, comprising:

a proximity detector that generates a proximity signal;

a duty-cycle adjustment signal generator that is responsive to the proximity signal to generate an adjustment signal;

a controller that in response to the adjustment signal, adjusts a transmission duty cycle relating to the repetitive time slots for transmitting a communication signal during at least one time slot; and an antenna that radiates the communication signal.

2. The communication device of claim 1, wherein the proximity signal relates to a proximity of the communication device to an object.

3. The communication device of claim 1, wherein the proximity sensor generates the proximity signal in accordance with the proximity of the communication device to a body.

4. The communication device of claim 1, wherein the proximity sensor comprises a switch that generates the proximity signal, wherein the proximity signal indicates whether or not the communication device is close to the object.

5. The communication device of claim 1 further including a transmitter that transmits a communication resource allocation request for a transmission duty cycle.

6. The communication device of claim 5, wherein the transmitter transmits the communication resource allocation request for a specified transmission power based on the proximity signal.

7. The communication device of claim 1, wherein the controller, in response to the proximity signal, adjusts a power of the transmitted communication signal.

8. The communication device of claim 1 further including a display screen to present an option of selecting the duty cycle.

9. The communication device of claim 1 further including a manual adjustment to adjust the duty cycle.

10. The communication device of claim 1, wherein the communication signal is communicated as data packets.

11. The communication device of claim 10 further including a transmitter that transmits a communication resource allocation request on a per packet basis.

12. A method for a communication device to transmit a communication signal during repetitive time slots, comprising:

generating a duty-cycle adjustment signal in response to a proximity signal;

adjusting a transmission duty cycle that relates to the repetitive time slots for transmitting a communication signal during at least one time slot, in response to the adjustment signal; and radiating the communication signal.

13. The method of claim 12, wherein the duty-cycle adjustment signal is generated based on the proximity of the communication device to an object.

14. The method of claim 12, wherein the duty-cycle adjustment signal is generated based on the proximity of the communication device to a body.

15. The method of claim 12, further including a step of transmitting a communication resource allocation request for a transmission duty cycle.

16. The method of claim 15, wherein the communication resource allocation request is for a specified transmission power based on a proximity signal.

17. The method of claim 15, wherein the communication resource allocation request is transmitted on a per packet basis.

18. The method of claim 12, wherein the transmission duty cycle is adjusted manually.

* * * * *